United States Patent [19]

Bailey

[11] 4,021,596

[45] May 3, 1977

[54] POLYARYLENE SULFIDE RESIN ALLOYS

[75] Inventor: Fay W. Bailey, Bartlesville, Okla.

[73] Assignee: Phillips Petroleum Company, Bartlesville, Okla.

[22] Filed: Apr. 22, 1975

[21] Appl. No.: 570,932

[52] U.S. Cl. .............................. 428/375; 260/823; 260/860; 428/412; 428/419
[51] Int. Cl.$^2$ ................. C08L 67/00; C08L 71/04; C08L 81/04
[58] Field of Search ............ 260/823, 860; 428/375

[56] References Cited

UNITED STATES PATENTS

| | | | |
|---|---|---|---|
| 3,321,449 | 5/1967 | Vogel | 260/79.3 |
| 3,354,129 | 11/1967 | Edmonds | 260/79 |
| 3,487,454 | 12/1969 | Oates | 260/900 |
| 3,594,446 | 7/1971 | Gabler | 260/823 |
| 3,647,766 | 3/1972 | Bertozzi | 260/860 |
| 3,655,822 | 4/1972 | McGrath | 260/857 TW |
| 3,699,087 | 10/1972 | Wood | 260/79 |
| 3,745,924 | 7/1973 | Scanlon | 102/43 P |
| 3,813,368 | 5/1974 | Villa | 260/79 |
| 3,817,930 | 6/1974 | Villa | 260/75 S |
| 3,882,091 | 5/1975 | Villa | 260/79 |
| 3,919,147 | 11/1975 | Villa | 260/26 |

OTHER PUBLICATIONS

Encyclopedia of Polymer Science & Technology, vol. 10, pp. 710–725, 735–752, 759–764, and 99–111 and vol. 11, pp. 447–463.
Modern Plastics Encyclopedia, Oct. 1968, vol. 45; No. 14A, pp. 260–263, 244–248.

Primary Examiner—Paul Lieberman

[57] ABSTRACT

Thermoplastic resin alloys containing polyphenylene sulfide resin and at least one other thermoplastic resin selected from the group consisting of polyarylsulfones, polyphenylene oxides, and polyarylcarbonates are disclosed which have certain physical properties that are better than those of at least one of the resins employed in preparing the alloy. Also, specific polyphenylene sulfide/polyarylsulfone alloy compositions are disclosed which have certain physical properties that are better than those of either the polyphenylene sulfide or the polyarylsulfone employed.

25 Claims, No Drawings

POLYARYLENE SULFIDE RESIN ALLOYS

This invention relates to polymer alloys containing polyphenylene sulfide resins. In another aspect, it relates to polymer alloys of polyphenylene sulfide resin and a polyarylsulfone, polyphenylene oxide, or polyaromatic carbonate thermoplastic resin.

For certain thermoplastic engineering applications alloys of two or more resins are prepared in order to obtain resins with a better balance of properties. For example, it is quite common to form an alloy of a first resin having certain desirable physical properties, such as tensile or impact strength, with a second resin having other desirable physical properties in hopes of obtaining an alloy that will have inherited at least some of the desirable physical properties of the first resin.

It is often impossible, however, to predict from the physical properties of the resins employed what physical properties the resulting polymer alloys will have. An example of the unpredictability of the physical properties of resin alloys is provided by U.S. Pat. No. 3,745,924, in columns 3–5, where alloys of several different resins are disclosed. In alloys prepared from polyethylene and polycarbonate the higher tensile strength of the polycarbonate was inherited to some extent by the alloy. However, note that the 90/10 polyethylene/nylon alloy had tensile strength that was less than that of polyethylene even though the nylon had twice the tensile strength of polyethylene. Further demonstrations of the unpredictability of the physical properties of resin alloys will be found in the examples in the latter part of this disclosure. Since the physical properties of the component resins are not always inherited, it is necessary to actually prepare alloys of specific resins in order to determine if the advantages in physical properties intrinsic in the individual resins will be carried through to the alloy.

An object of this invention is to provide alloys of polyphenylene sulfide resin and other thermoplastic resins which will have desirable properties. Also, it is an object of this invention to provide polyphenylene sulfide containing alloys that have certain properties that are better than at least one of the resins employed in preparing the alloy.

It is also an object of this invention to provide polyphenylene sulfide resin-containing thermoplastic alloys which have better impact resistance than that of polyarylene sulfide.

A further object is to provide a polyphenylene sulfide resin-containing alloy that has better solvent stress cracking resistance than the polyphenylene sulfide resin employed.

A further object is to provide a polyphenylene sulfide alloy insulation for conductive wire which has improved solvent stress cracking resistance.

In accordance with this invention, polyphenylene sulfide is mixed with one or more thermoplastics selected from the group consisting of polyarylsulfone, polyphenylene oxide, or polyarylcarbonate to form alloys which exhibit some physical properties which are an improvement over those possessed by the polyarylene sulfide alone.

In the following description the term blend is to be distinguished from the term alloy. The term blend as used herein is intended to denote merely physically separable mixtures of polymers such as are obtained when pellets of two different resins are mixed together by tumbling. The term alloy on the other hand is intended to denote the type of unitary mass which results when a mixture of resins has been subjected to mixing while the resins were in a melted state.

The alloys of this invention are prepared using conventional techniques known in the art for producing such unitary masses from two or more resins. For example, the alloys can be formed by mixing the dry powders or pellets of the resins by tumbling, etc., followed by further mixing in an extruder, or other suitable polymer compounding device, under conditions such that the resins employed will melt. The mixing that takes place during conventional injection molding will also suffice to produce the alloy. Other conventionally known methods of forming alloys of resins may also be employed, for example, melt mixing in a Banbury mixer. In order to form the alloy, the temperature has to be at least high enough that the resins employed will melt. Preferably in molding, the temperature is kept sufficiently low to insure that none of the resins will be degraded by the heat. The resulting alloy can be granulated or pelletized, if desired, to improve its handling characteristics for subsequent molding operations.

The polyphenylene sulfide resins employed in this invention can be prepared by various methods. For example, they can be prepared as described in U.S. Pat. No. 2,513,188 wherein polyhaloaromatic compounds are reacted with sulfur and a metal sulfide at the fusion temperature. The resin can also be formed by the method described in British Pat. No. 962,941 wherein metal salts of halothiophenols are heated at a polymerizing temperature. A particularly preferred method of preparing the resins is the method disclosed in U.S. Pat. No. 3,354,129, wherein a solution of polyhalo compounds are reacted with alkaline metal sulfides. If it is desired to employ a polyphenylene sulfide of lower melt flow than that obtained through the process of the above-mentioned patent, the polymers thus obtained can be modified according to the method disclosed in U.S. Pat. No. 3,699,087. Since these techniques are now known to those skilled in the art as evidenced by the just mentioned patents, further description will not be set forth here. For more detail one may refer to those patents.

The type of polyarylsulfone thermoplastics used to prepare the inventive alloys are described in Volume 11 of the Encyclopedia of Polymer Science and Technology on pages 447–463. They are polymers derived from dihydric phenols and 4,4'-dichlorodiphenylsulfone. A particularly favored polyarylsulfone of this type is the polysulfone prepared using 2,2-bis(4-hydroxyphenyl)propane, also known as Bisphenol A. Bisphenol A derived polysulfones are commercially available from Union Carbide Corporation under the trademarks Udel P-1700 and Udel P-3500.

Another favored polyarylsulfone that can be employed is the copolymeric polyarylsulfone of the type described in U.S. Pat. No. 3,321,449, the disclosure of which is incorporated herein by reference. A particular copolymeric polyarylsulfone which is preferred is sold under the trademark Astrel 360 by the Minnesota Mining and Manufacturing Company. This polyarylsulfone is characterized as one containing biphenyl and phenyl units linked only by oxygen or sulfone units.

The polyphenylene oxide polymers used in the alloys with the polyphenylene sulfide resins are described on pages 92-110 of Volume 10 of the Encyclopedia of Polymer Science and Technology and on pages 244-248 of Volume 44, No. 14A of the 1968–69 Modern Plastics Encyclopedia. A particularly preferred polyphenylene oxide polymer is the 2,6 xylenol derived polymer available from General Electric Company under the trademark PPO.

The polyarylcarbonate polymers used in forming alloys with polyphenylene sulfide in this invention are those such as described in Volume 45, No. 14A of the 1968–69 Modern Plastics Encyclopedia on pages 260–263, and in Volume 10 of the Encyclopedia of Polymer Science starting on page 710. The Bisphenol A derived polyarylcarbonates are particularly preferred. Exemplary of such a polycarbonaate is the resin available from General Electric Company under the trademark Lexan.

The above-mentioned thermoplastics are available in forms having different melt flow properties. Resins having melt flows ranging from about 1 to about 200 are generally referred to as molding grade resins. While it is preferred to form the inventive alloys from blends of molding grade resins, alloys may also be prepared using resins having melt flows above or below that of the molding grade range. With resins having melt flow less than 1 molding can become difficult. On the other hand, material with melt flows above 200 is often too fluid for injection molding or extrusion. The high melt flow alloys are, however, useful for preparing coatings upon metal substrate which will exhibit good flexibility as well as satisfactory heat resistance and strength. For such applications alloys with melt flows of about 500–3500 can be employed. The methods for coating such metal include such conventional techniques as fluid bed treatment or slurry coating followed by baking, flame spraying, or the like.

Fillers, stabilizers, dyes, plasticizers, and other conventional additives that display no antagonistic behavior towards the resulting thermoplastic alloys, such as promoting degradation, may be added to the inventive compositions if it is desired. They may be added to the individual resins before the formation of the alloy, they may be added during the formation of the alloy, or they may be added after the formation of the alloy upon a subsequent melting of the alloy.

The resin alloys prepared according to this disclosure have diverse uses. Those of the molding grade may be used for the formation of molded or extruded thermoplastic articles. The polyphenylene sulfide imparts properties that are especially good for those thermoplastic articles that need to be resistant to high temperature and chemical attack. All the resin alloys are generally useful for coating metal substrates. The alloy employing a Bisphenol A type polyarylsulfone has utility as electrical insulation either in the form of insulating tape prepared from the alloy or in the form of coatings of the alloy upon the structure to be insulated.

The amounts of the above-mentioned thermoplastics employed with the polyphenylene sulfide can vary over a wide range. Generally the polyphenylene sulfide should account for 10 to about 90 weight percent of the resin in the alloy, preferably the polyphenylene sulfide should account for 25 to 75 weight percent of the resin in the alloy. As will become evident in the following examples, when certain resins are employed there will be particular ratios of the resins which will provide the most desirable balance of properties for certain applications. For instance, the examples below will show that in polyphenylene sulfide/Bisphenol A type-polyarylsulfone alloys of certain weight ratios, certain properties, such as tensile strength or flexural strength, are better than those of either of the two resins employed in preparing the alloys.

EXAMPLE I

A series of approximately homogeneous physical blends was prepared by mixing pellets of polyphenylene sulfide, having a melt flow of 55 and a specific gravity of 1.34 with pellets of a Bisphenol A derived polyarylsulfone, having a melt flow of 10.6 and a specific gravity of 1.24. The polyphenylene sulfide employed is known in commerce under the trademark Ryton and can be obtained from Phillips Petroleum Company. The polyarylsulfone was available in commerce from the Union Carbide Company under the trademark Udel P-1700. Each blend of resin pellets was injection molded to form alloy test specimens and physical properties of the specimens were determined. The results are presented in Table I along with the physical properties of test specimens prepared from the straight polyphenylene sulfide and polyarylsulfone resins employed. In the tables, polyphenylene sulfide is indicated by PPS and polyarylsulfone by PS.

Each polyphenylene sulfide polymer used in the Examples was prepared according to U.S. Pat. No. 3,354,129 by reacting dichlorobenzene and sodium sulfide in a N-methylpyrrolidone solvent and recovering the product. The recovered polymer was subsequently heat treated in an air oven at about 500° F (260° C) for a time sufficiently long to obtain a product having the melt flow disclosed in each Example. The melt flow is determined in accordance with the procedure described in ASTM D 1238-70 at 316° C (600° F) using a 5 kg. weight and is reported as flow in grams per 10 minutes.

TABLE I

| | | | | | |
|---|---|---|---|---|---|
| PPS, Wt. % | 100 | 75 | 50 | 25 | 0 |
| PS, Wt. % | 0 | 25 | 50 | 75 | 100 |
| Physical Properties of Blends | | | | | |
| Flexural Modulus, psi × 10⁻³ (a) | 478 | 470 | 442 | 398 | 378 |
| Flexural Strength, psi (a) | 17,320 | 18,740 | 17,460 | 16,780 | 16,420 |
| Tensile Strength, Yield, psi (b) | — | — | 11,040 | — | — |
| Tensile Strength, Break, psi (b) | 7,490 | 9,860 | — | 10,840 | 10,280 |
| Elongation % (b) | 3 | 4 | 58 | 34 | 78 |
| Izod Impact (⅛" × ¼") | | | | | |
| Foot Lbs/Inch Notch (c) | 0.3 | 0.4 | 0.5 | 0.6 | 0.8 |
| No Notch, Ft. lbs. | 2.5 | 5.3 | 10.6 | 16.4 | 96.0 |

(a) ASTM D790
(b) ASTM D638
(c) ASTM D256

The table shows that the alloys of polyphenylene sulfide and polyarylsulfone have a better balance of physical properties than either control resin alone. The impact strength of the alloy increases as the percentage of polyarylsulfone is increased. The flexural strength and flexural modulus of the alloy are greater than those of the polyarylsulfone resin and the tensile strength of the alloy is greater than that of the polyphenylene sulfide resin. Especially notable is the fact that certain of the alloys have flexural strength or tensile strength that is greater than that of either of the separate resins employed in preparing the alloys. For example, the alloys in which 25 and 50 percent of the resin is polyarylsulfone have greater flexural strength than either of the individual resins. This is a further illustration that one cannot predict the physical properties of alloys from the physical properties of the resins employed in preparing them.

EXAMPLE II

Another series of pellet blends was prepared using a polyphenylene sulfide with a melt flow of about 10 and a Bisphenol A type polyarylsulfone with a melt flow of about 12. The polyphenylene sulfide was available in commerce under the trademark Ryton and the polyarylsulfone under the trademark Udel P-1700. The blends were used to prepare alloys which were tested as in Example I. The results were presented in Table II.

TABLE II

| | | | | | | | | | | | | |
|---|---|---|---|---|---|---|---|---|---|---|---|---|
| PPS, Wt. % | 100 | 90 | 80 | 75 | 70 | 60 | 55 | 50 | 45 | 40 | 25 | 0 |
| PS, Wt. % | 0 | 10 | 20 | 25 | 30 | 40 | 45 | 50 | 55 | 60 | 75 | 100 |
| Melt Flow | 10 | 8 | 8 | 8 | 8 | 10 | 10 | 9 | 10 | 11 | 16 | 12 |
| Flexural Modulus, psi × $10^{-3}$ | 633 | 604 | 563 | 542 | 525 | 487 | 468 | 451 | 431 | 422 | 396 | — |
| Tensile Strength, psi | 8200 | 8000 | 9000 | 9400 | 11,100 | 10,800 | 11,300 | 11,300 | 11,300 | 11,300 | 11,100 | 10,500 |
| Elongation, per cent | 3 | 3 | 3 | 4 | 5 | 5 | 6 | 8 | 14 | 36 | 38 | 91 |
| Izod Impact, foot pounds/ inch of notch | 0.2 | 0.2 | 0.2 | 0.3 | 0.3 | 0.3 | 0.3 | 0.3 | 0.3 | 0.4 | 0.5 | 0.9 |
| Izod Impact, No Notch | 1.7 | 2.0 | 1.9 | 2.4 | 2.2 | 2.6 | 3.0 | 4.5 | 5.5 | 9.4 | 18.6 | No Break |
| Heat Distortion Temp., F | 230 | 230 | 250 | 250 | 265 | 294 | 294 | 306 | 303 | 320 | 309 | 329 |
| Flexural Strength, psi × $10^{-3}$ | 16.2 | 16.5 | 18.8 | 17.4 | 18.3 | 18.0 | 18.8 | 18.0 | 17.4 | 17.7 | 16.5 | 15.9 |
| Dielectric Constant 25 ± 1° C | | | | | | | | | | | | |
| 1.0 KHz | 3.2 | 3.2 | 3.2 | 3.3 | 3.3 | 3.2 | 3.2 | 3.2 | 3.2 | 3.2 | 3.2 | 3.2 |
| 1.0 MHz | 3.2 | 3.2 | 3.2 | 3.3 | 3.2 | 3.2 | 3.2 | 3.2 | 3.2 | 3.2 | 3.2 | 3.2 |
| Dissipation Factor 25 ± 1° C | | | | | | | | | | | | |
| 1.0 KHz | 9.6 × $10^{-4}$ | 9.2 × $10^{-4}$ | 8.9 × $10^{-4}$ | 9.1 × $10^{-4}$ | 9.6 × $10^{-4}$ | 9.5 × $10^{-4}$ | 9.5 × $10^{-4}$ | 9.6 × $10^{-4}$ | 9.7 × $10^{-4}$ | 9.3 × $10^{-4}$ | 10.3 × $10^{-4}$ | 11.4 × $10^{-4}$ |
| 1.0 MHz | 9.0 × $10^{-4}$ | 13 × $10^{-4}$ | 17 × $10^{-4}$ | 20 × $10^{-4}$ | 21 × $10^{-4}$ | 26 × $10^{-4}$ | 27 × $10^{-4}$ | 31 × $10^{-4}$ | 34 × $10^{-4}$ | 35 × $10^{-4}$ | 46 × $10^{-4}$ | 61 × $10^{-4}$ |
| Volume Resistivity at two minutes ohm-cm × $10^{-16}$ | 2 | 6 | 8 | 3 | 10 | 4 | 8 | 8 | 5 | 4 | 1 | 2 |

The results again establish that the flexural strength and flexural modulus of the alloys are greater than those of the polyarylsulfone resin and that when at least 20 weight percent of polyphenylene sulfide resin is employed that the tensile strength of the alloy is greater than that of the polyphenylene sulfide resin. It is also shown that for many alloys of the polyphenylene sulfide and the polyarylsulfone the tensile strength and flexural strength obtained is greater than for either of the constituent resins. The increase in impact strength with increase in polyarylsulfone resin is also again demonstrated.

Table II shows also the electrical characteristics of the alloys were evaluated. The polyarylsulfone improves the electrical properties of the polyphenylene sulfide resin. The data thus show that for applications of thermoplastic resins where greater tensile strength, impact strength, flexural strength, or resistivity are desired, it would be advantageous to blend the Bisphenol A type polyarylsulfone with the polyphenylene sulfide to form an alloy.

EXAMPLE III

Lengths of number 14 aluminum wire, preheated to 210° F (99° C), were extrusion coated at 600° F (316° C) with (1) a polyphenylene sulfide having a melt flow of 36, (2) a Bisphenol A type polyarylsulfone having a melt flow of 7.4, and (3) a 50/50 weight percent alloy of the just mentioned polyphenylene sulfide and polyarylsulfone resins. The polyphenylene sulfide and the polyarylsulfone employed are known in commerce under the trademarks Ryton and Udel P-3500, respectively. The resulting coated wires were tested to determine the flexibility of the coating by wrapping a section of each sample tightly around its own diameter for at least 5 times (bend test) and for stress cracking resistance by immersing a section of each sample wound on its own diameter in toluene (solvent resistance). The results are presented in Table III.

TABLE III

| | Wire Coating Tests | | |
|---|---|---|---|
| Coating Resin | Coating Thickness Mils | Bend Test | Solvent Resistance |
| PPS | 30 | Fail | Not tested |
| PS | 31 | Pass | Stress crack in 1 minute |
| 50/50 PPS/PS | 22 | Pass | No stress cracking in 30 days |
| 50/50 PPS/PS | 31 | Pass | No stress cracking in 30 days |

The advantages exhibited by the 50/50 weight percent alloy of polyphenylene sulfide and Bisphenol A type polyarylsulfone over each of the individual resins are clearly demonstrated. The polyphenylene sulfide wire coating is not flexible enough to withstand the Bend Test and the polyarylsulfone wire coating is very susceptible to stress cracking in an aromatic solvent. The wire coated with the 50/50 alloy, however, at two different coating thicknesses is flexible enough to pass the Bend Test and did not stress crack in the aromatic solvent after immersion for 30 days.

EXAMPLE IV

A series of pellet blends was prepared by mixing polyphenylene sulfide having a melt flow of 55 and a specific gravity of 1.34 with pellets of a copolymeric polyarylsulfone having a melt flow of 0 and a specific gravity of 1.36. The copolymeric polyarylsulfone employed is known in commerce under the trademark Astrel 360. Each blend composition was injection molded to form alloy test specimens and the physical properties of the specimens determined using the same test as those set forth in Table I. The physical properties of the test specimens are presented below in Table IV. In the table, polyphenylene sulfide is indicated by PPS and the copolymeric polyarylsulfone by CPS.

TABLE IV

| | | | |
|---|---|---|---|
| PPS, Wt. % | 100 | 75 | 50 |
| CPS, Wt. % | 0 | 25 | 50 |
| Physical Properties of Blends | | | |
| Flexural Modulus, psi × 10⁻³ | 529 | 452 | 610 |
| Flexural Strength, psi | 17,740 | 13,040 | 20,490 |
| Tensile Strength, Yield, psi | — | — | — |
| Tensile Strength, Break, psi | 7,030 | 8,410 | 11,010 |
| Elongation, % | 3 | 3 | 4 |
| Izod Impact (½" × ¼") | | | |
| Foot Lbs/Inch Notch | — | — | — |
| No Notch, Ft. Lbs. | 3.0 | 2.1 | 2.1 |

The data indicate that alloys of copolymeric polyarylsulfone and polyphenylene sulfide like the Bisphenol A derived polyarylsulfone resin/polyphenylene sulfide resin alloys of Examples I and II had greater tensile strength than that of the polyphenylene sulfide resin employed. The data also show that when 50 weight percent of the resin in the polyphenylene sulfide alloy is the copolymeric polyarylsulfone that the flexural strength and flexural modulus are greater than that of the polyphenylene sulfide. In Examples I and II, on the other hand, the flexural strength and flexural modulus were greater than that of the polyarylsulfone employed.

EXAMPLE V

A series of pellet blends was prepared by mixing pellets of polyphenylene sulfide having a melt flow of 55 and pellets of a polyphenylene oxide having a melt flow of 13. The polyphenylene oxide was obtained from the General Electric Company under the trademark PPO 531-801. Each pellet blend composition was injection molded to form alloy test specimens and the physical properties determined according to the methods used in Table I. The results are presented in Table V. PPO denotes the polyphenylene oxide and PPS denotes polyphenylene sulfide resin.

TABLE V

| | | | | | |
|---|---|---|---|---|---|
| PPS, Wt.% | 100 | 75 | 50 | 25 | 0 |
| PPO, Wt. % | 0 | 25 | 50 | 75 | 100 |
| Physical Properties | | | | | |
| Flexural Modulus, psi × 10⁻³ | 521 | 461 | 429 | 391 | 377 |
| Flexural Strength, psi | 18,470 | 13,550 | 14,440 | 14,970 | 16,460 |
| Tensile Strength, Break, psi | 9,400 | 7,300 | 7,830 | 10,270 | 10,890 (yield) |
| Elongation, % | 3 | 3 | 4 | 6 | 25 |
| Izod Impact (½" × ¼") | | | | | |
| Foot Lbs/Inch Notch | 0.3 | 0.3 | 0.3 | 0.4 | 0.6 |
| No Notch, Ft. Lbs. | 2.2 | 2.3 | 2.6 | 6.2 | 18.5 |

The above data indicate that the impact strength of the polyphenylene sulfide/polyphenylene oxide alloys are greater than or equal to that of the polyphenylene sulfide. The flexural modulus of the alloys was greater than that of the polyphenylene oxide employed.

EXAMPLE VI

Another series of pellet blends was prepared by mixing pellets of polyphenylene sulfide having a melt flow of 55 with pellets of a polyarylcarbonate with the trademark Lexan 141. The polyarylcarbonate was a Bisphenol A derived polycarbonate having a melt flow of 105. These pellet mixtures were then subjected to further mixing in an extruder to form the alloys and then alloys were pelletized. Each of the control resins was subjected to similar treatment. The resulting alloy pellets and control pellets were injection molded into test specimens and the physical properties determined in a manner used in the previous tables. The results of the evaluation are presented in Table VI wherein PC denotes the polyarylcarbonate and PPS denotes the polyphenylene sulfide.

TABLE VI

| | | | | |
|---|---|---|---|---|
| PPS, Wt. % | 100 | 70 | 50 | 0 |
| PC, Wt. % | 0 | 30 | 50 | 100 |
| Physical Properties | | | | |
| Flexural Modulus, psi × $10^{-3}$ | 513 | 426 | 390 | 361 |
| Flexural Strength, psi | 18,570 | 14,140 | 15,420 | 12,500 |
| Tensile Strength, Break, psi | 9,350 | 8,040 | 7,510 | 9,500 |
| Elongation, % | 4 | 4 | 4 | 75 |
| Izod Impact (⅛" × ¼") | | | | |
| No Notch, Ft. lbs. | 2.3 | 2.7 | 3.9 | 55 |

The data show that the alloys have a greater impact resistance than the polyarylene sulfide employed and that the alloys have greater flexural strength and flexural modulus than the polyarylcarbonate employed. Yet the tensile strength of the alloys was less than that of either of the resins employed, a still further example that one cannot predict with any reasonable degree of certainty that particular properties possessed by the individual resins will be passed on to alloys formed from those resins. It should be clear that only by actually preparing a few of the alloys can one get some feeling for how the resins will perform together.

EXAMPLE VII

A pellet blend of equal parts of polyphenylene sulfide and a polyarylsulfone was prepared by mixing pellets of the two resins. The blend was then injection molded to form alloy test specimens. Similarly, an alloy of equal parts of the polyphenylene sulfide having a melt flow of 55, the polyarylsulfone with the trademark Udel P-3500, and a polyarylcarbonate with the trademark Lexan 141 was prepared. As a control the polyphenylene sulfide was also subjected to identical treatment. The physical properties were determined according to the methods used in the preceding examples. The abbreviations PPS, PS, and PC have the same meaning as in the preceding Examples. The results were as follows:

TABLE VII

| | | | |
|---|---|---|---|
| PPS, wt. % | 100 | 50 | 33⅓ |
| PS, Wt. % | — | 50 | 33⅓ |
| PC, Wt. % | — | — | 33⅓ |
| Physical Properties | | | |
| Flexural Modulus, psi × $10^{-3}$ | 531 | 438 | 403 |
| Flexural Strength, psi | (a) | 18,800 | 8,580 |
| Tensile Strength, psi | 6080 | 11,400 | 5,540 |
| Elongation, % | 2 | 5 | 2 |

TABLE VII-continued

| | | | |
|---|---|---|---|
| Izod, Foot Lbs/Inch Notch | 0.23 | 0.39 | 0.27 |

(a) not determined

The data show that although some of the properties of the polyphenylene sulfide/polyarylsulfone/polycarbonate alloy are inferior to those of polyphenylene sulfide, that the impact strength of the alloy is better than that of the polyphenylene sulfide.

It is to be understood that the foregoing disclosure and the foregoing examples are given only as an illustration and an example to enable those skilled in the art to understand and practice the invention. Illustrative details disclosed are not to be construed as limitations on the invention. Obvious modifications and variations will be within the scope of the following claims.

I claim:

1. A unitary thermoplastic mass comprising polyphenylene sulfide and at least one other thermoplastic resin selected from the group consisting of polyarylsulfones, polyarylcarbonates, and polyphenylene oxides.

2. A composition in accordance with claim 1 wherein the unitary mass is produced by forming an approximately homogeneous mixture of the resins employed and then mixing the resins at a temperature which is sufficiently high to cause the resins to form said unitary mass and sufficiently low to prevent degradation of the resins.

3. A compositon of matter in accordance with claim 1 wherein the unitary thermoplastic mass comprises polyphenylene sulfide an polyarylsulfone, said polyarylsulfone accounts for about 10 to about 90 weight percent of the resin in the composition and said polyphenylene sulfide accounts for about 90 to about 10 weight percent of the resin in the composition.

4. A composition of matter in accordance with claim 3 wherein the polyphenylene sulfide and the polyarylsulfone are molding grade resins.

5. A composition in accordance with claim 4 wherein the polyarylsulfone is derived from the reaction of dihydric phenol an 4,4'-dichlorodiphenylsulfone.

6. A composition in accordance with claim 5 wherein the dihydric phenol is 2,2-bis(4-hydroxyphenyl)propane.

7. A composition in accordance with claim 6 wherein said polyarylsulfone accounts for about 20 to about 75 weight percent of the resin in the composition and the polyphenylene sulfide accounts for the remainder of the resin.

8. A composition in accordance with claim 4 wherein the polyarylsulfone is copolymeric polyarylsulfone.

9. A composition in accordance with claim 8 wherein the copolymeric polyarylsulfone contains biphenyl and phenyl units linked only by oxygen or sulfone units.

10. A composition in accordance with claim 1 wherein the unitary thermoplastic mass comprises polyphenylene sulfide and a polyarylcarbonate, said polyarylcarbonate accounts for about 10 to about 90 percent by weight of the resin of the composition and said polyphenylene sulfide accounts for about 90 to about 10 percent by weight of the resin in the composition.

11. A composition in accordance with claim 10 wherein the polyarylcarbonate is a 2,2-bis(4-hydroxyphenyl)propane derived polycarbonate and both the polycarbonate and the polyphenylene sulfide are molding grade resins.

12. A composition in accordance with claim 1 wherein the unitary thermoplastic mass comprises polyphenylene sulfide and a polyphenylene oxide, said polyphenylene oxide accounts for about 10 to about 90 percent by weight of the resin in the composition and said polyphenylene sulfide accounts for about 90 to about 10 weight percent of the resin in the composition.

13. A composition in accordance with claim 12 wherein the polyphenylene oxide is prepared from a 2,6di-alkyl substituted phenol and both the polyphenylene oxide and the polyphenylene sulfide are molding grade resins.

14. A composition in accordance with claim 13 wherein the 2,6 di-alkyl substituents on the phenol are methyl groups.

15. A method of forming a polyphenylene sulfide containing alloy which has higher impact resistance than the polyphenylene sulfide employed comprising forming an alloy of polyphenylene sulfide and an amount of at least one non-polyphenylene sulfide thermoplastic, selected from the group consisting of a polyarylsulfone derived from 2,2-bis(4-hydroxyphenyl)propane, a polyarylcarbonate derived from 2,2-bis(4-hydroxyphenyl)propane, or a polyphenylene oxide derived from a 2,6 di-methyl substituted phenol sufficient to insure that the resulting compositon has an impact resistance greater than that possessed by the polyarylene sulfide.

16. A method in accordance with claim 15 wherein the polyphenylene sulfide and the thermoplastics are all molding grade resins.

17. A thermoplastic electric insulation having superior solvent stress cracking resistance comprising the composition of claim 5.

18. An insulation in accordance with claim 17 wherein the insulation takes the form of electrical insulation tape.

19. An insulated wire in accordance with claim 22 wherein the polyarylsulfone comprises approximately 50 weight percent of the resin in the coating composition and the polyphenylene sulfide accounts for the remainder of the resin.

20. An insulated wire according to claim 19 wherein the thickness of the coating on the wire is between about 20 mils ($5.08 \times 10^{-2}$cm ) and 30 mils ($7.62 \times 10^{-2}$cm).

21. An insulated wire in accordance with claim 19 wherein the dihydric phenol employed in preparing the polyarylsulfone is 2,2-bis(4-hydroxyphenyl)propane.

22. An insulated wire comprising a wire coated with the composition of claim 5.

23. A method according to claim 15 wherein the amount of said non-polyphenylene sulfide thermoplastic accounts for about 10 to about 90 percent by weight of the thermoplastic in said alloy.

24. A method of forming a polyphenylene sulfide containing alloy that has at last one property that is better than that of at least one of the resins employed in preparing the alloy comprising forming an alloy of sufficient amounts of polyphenylene sulfide and at least one nonpolyphenylene sulfide thermoplastic selected from the group consisting of polyarylsulfones, polyarylcarbonates, and polyphenylene oxides.

25. A composition of matter in accordance with claim 1 comprising polyphenylene sulfide and an amount of at least one non-polyphenylene sulfide thermoplastic, selected from the group consisting of a polyarylsulfone derived from 2,2-bis(4-hydroxyphenyl)propane, a polycarbonate derived from 2,2-bis(4-hydroxyphenyl)propane, or polyphenylene oxide derived from a 2,6-di-methyl substituted phenol, sufficient to insure that the resulting composition has an impact resistance greater than that possessed by the polyarylene sulfide.

* * * * *